United States Patent [19]

Tanimoto et al.

[11] 4,220,564
[45] Sep. 2, 1980

[54] HIGH-HARDNESS AND HIGH-MODULUS RUBBER COMPOSITION CONTAINING 1,2-POLYBUTADIENE

[75] Inventors: Tsutomu Tanimoto; Mutsuo Nagasawa, both of Yokkaichi; Junji Kashiwakura, Asahimachi, all of Japan

[73] Assignee: Japan Synthetic Rubber Co., Ltd., Tokyo, Japan

[21] Appl. No.: 1,274

[22] Filed: Jan. 5, 1979

[30] Foreign Application Priority Data

Jan. 9, 1978 [JP] Japan ................................ 53-973
Sep. 25, 1978 [JP] Japan .............................. 53-117657

[51] Int. Cl.$^2$ ........................... C08L 7/00; C08L 9/06
[52] U.S. Cl. .................................. 260/5; 260/23.7 M; 260/33.6 AQ; 260/42; 260/45.9 QB; 525/236; 525/237
[58] Field of Search .................... 260/5, 894; 526/41; 525/236, 237, 191

[56] References Cited

U.S. PATENT DOCUMENTS 3,696,062  10/1972  Lesage et al. ........................ 260/5
3,827,991  8/1974  Ando et al. ...................... 260/42.32

Primary Examiner—Theodore E. Pertilla
Attorney, Agent, or Firm—Oblon, Fisher, Spivak, McClelland & Maier

[57] ABSTRACT

A novel rubber composition is obtained by blending a rubber mixture consisting of 15 to 50 parts by weight of 1,2-polybutadiene having a 1,2-addition unit content of 70% or more, a crystallinity of 5 to 40% and an intrinsic viscosity [$\eta$] of 0.7 dl/g or more (as measured in toluene at 30° C.) and 85 to 50 parts by weight of at least one rubber selected from the group consisting of natural rubber and diene-based rubbers with 3 to 10 parts by weight of sulfur per 100 parts by weight of said rubber mixture. Said rubber composition has a desirable processability and exhibits, on curing, high hardness, high modulus, low temperature dependency of physical properties, low heat generation and excellent blow-out resistance. It is suitable as a rubber material for use in various low profile automobile tires such as radial tires.

14 Claims, 3 Drawing Figures

U.S. Patent  Sep. 2, 1980  4,220,564
FIG.1
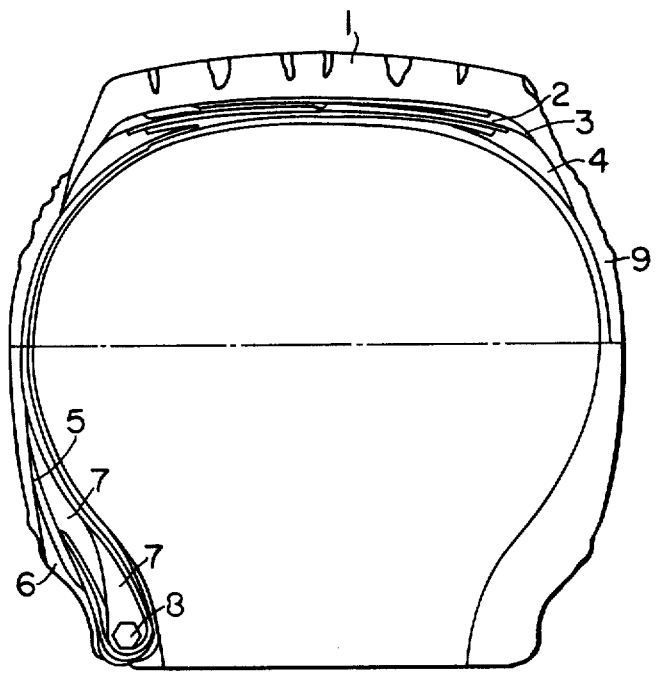
FIG.2
FIG.3
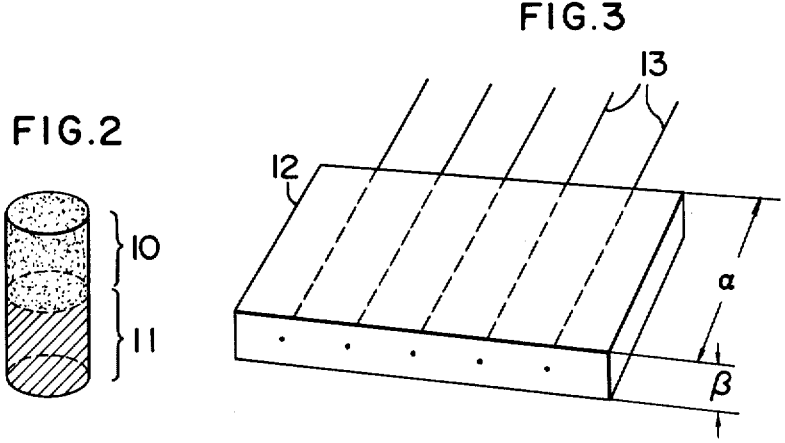

HIGH-HARDNESS AND HIGH-MODULUS RUBBER COMPOSITION CONTAINING 1,2-POLYBUTADIENE

This invention relates to a high-hardness and high-modulus rubber composition. More particularly, it relates to a high-hardness and high-modulus rubber composition suitable for use in tire members and industrial rubber products, which, in uncured state, is excellent in flow characteristics and green strength and exhibits, on curing, a high hardness and high modulus, both being low in temperature dependency, a markedly low rate of heat generation, and particularly an excellent blow-out resistance.

In the recent rubber business world, a demand for rubber material of a high hardness and high modulus, both being low in temperature dependency, has been increased. Heretofore, in order to obtain a rubber material which meets such a requirement, attempts have been made to incorporate a rubber with a large proportion of carbon black or other fillers or to blend the rubber with resins. However, when a large amount of fillers is incorporated, there is inevitably caused deterioration in both processability and flow characteristics. Such a composition yields a vulcanizate which shows unsatisfactory test results such as a high rate of heat generation in dynamic test and the time is short for failure due to blow-out in the compression fatigue test. When a resin is blended, there is obtained no satisfactory composition because the composition is inferior in physical properties such as impact resilience and the like, and is high in temperature dependency of physical properties.

The temperature dependency of physical properties, particularly the degree of change in physical properties such as hardness and modulus in the temperature range of from room temperature to 80° C. or 100° C. is important. Said change being great often becomes a fatal defect for the material to be used in the region where a high hardness is required and where the material is exposed to high temperatures. For instance, if such a material is used in some part of a tire, a great decrease in hardness or modulus owing to the heat generated during the running of the tire might possibly lead to a danger to the life of passengers. Such a rubber material is unsatisfactory particularly as rubber element for various low profile tires such as radial tire or the like required by recent high speed cars. These tires are more complicated in structure than conventional bias tires and have a lower profile and, hence, an enlarged contact area. Therefore, more severe performance characteristics are required particularly in the tire member in which a high-hardness rubber is used, than in the conventional tires.

U.S. Pat. No. 3,827,991 discloses that a rubber composition comprising 3 to 50% by weight of 1,2-polybutadiene and 97 to 50% by weight of at least one conjugated diene-based rubbery polymer has a high green strength and excellent processability and gives a vulcanizate having a high hardness and excellent resistance to ozone and weathering. However, it does not teach at all the characteristics to meet the aforementioned requirements.

The present inventors have carried out studies to develop a rubber material having none of the aforementioned defects and, as a result, have found that when a mixture consisting of the 1,2-polybutadiene (hereinafter referred to as 1,2-PB) described in U.S. Pat. No. 3,827,991 and a rubber for general purpose such as natural rubber or a diene-based rubber is crosslinked so that the residual crystallinity and the coefficient of volume change may become specific values, there is obtained a rubber material having a high hardness, a high modulus, low temperature dependency of physical properties, low heat generation, excellent blow-out resistance, and excellent processability.

An object of this invention is to provide a high-hardness and high-modulus rubber composition.

Another object of this invention is to provide a rubber composition suitable for use in various low profile automobile tires.

Other objects and advantages of this invention will become apparent from the following description and the accompanying drawings.

According to this invention, there is provided a rubber composition comprising 15 to 50 parts by weight of a 1,2-PB having a 1,2-addition unit content of 70% or more, 85 to 50 parts by weight of a rubber co-crosslinkable with said 1,2-PB, and 3 to 10 parts by weight of sulfur per 100 parts by weight of said rubber ingredients. This rubber composition has a residual crystallinity of 4% or less and a coefficient of volume change of 100% or more (in toluene) and gives a crosslinked product having a high hardness and a high modulus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a cross sectional view of a tire;

FIG. 2 is a schematic view of a test specimen used in the tests of the Examples; and FIG. 3 shows the form of test specimens employed in the Examples.

The term "residual crystallinity" used herein means a value obtained by applying the results of measurement by a differential scanning calorimeter (DSC) to the following equations (1) and (2):

$$x' (\%) = \frac{A}{A_o} \times B \times \frac{a}{a_o} \div b \quad (1)$$

where
- $x'$ (%): the residual crystallinity of 1,2-PB phase;
- $A_o$: the area corresponding to the heat of fusion of the crystalline 1,2-PB, as measured by DSC;
- $A$: the area corresponding to the heat of fusion of the crystalline 1,2-PB phase in the crosslinked rubber composition, as measured by DSC;
- $B$: the crystallinity (%) of 1,2-PB as measured by the gradient density tube method;
- $a$: the weight (g) of 1,2-PB tested;
- $a_o$: the weight (g) of crosslinked rubber composition tested; and
- $b$: the weight fraction (%) of 1,2-PB in the crosslinked rubber composition tested.

$$x (\%) = x' \times a \quad (2)$$

where
- $x$: the residual crystallinity (%) of crosslinked rubber composition tested;

x': the residual crystallinity of 1,2-PB phase; and

α: the weight fraction (%) of 1,2-PB in 100 parts by weight of the rubber ingredients in the rubber composition tested.

The term "coefficient of volume change" used herein means a value obtained by the following equation (3):

$$\Delta V = \frac{(W_3 - W_4) - (W_1 - W_2)}{W_1 - W_2} \times 100 \quad (3)$$

where

ΔV: coefficient of volume change;

$W_1$: the weight (g) in air of the specimen before immersion;

$W_2$: the weight (g) in water of the specimen before immersion;

$W_3$: the weight (g) in air of the specimen after immersion; and $W_4$: the weight (g) in water of the specimen after immersion.

The conditions for immersion are as follows:
Solvent: toluene;
Temperature of immersion: 40° C.;
Time of immersion: 48 hours.

The residual crystallinity of the crosslinked rubber composition of this invention is 4% or less, preferably 3% or less, in view of the temperature dependency of the physical properties. The residual crystallinity is 4% or less, and the smaller the better. With a decrease in crystallinity, the temperature dependency becomes smaller. The coefficient of volume change is 100% or more, preferably 120 to 200%. If the percentage volume change is less than 100%, the residual crystallinity is hardly observed, but the rubbery characteristics are lost because of marked transformation to ebonite.

The 1,2-PB for use in the composition of this invention contains 70% or more, preferably 80% or more of 1,2-addition units. In view of the workability, the crystallinity is 40% to 5%, preferably 30% to 10%. The intrinsic viscosity [η], as measured in toluene at 30° C., is 0.7 dl/g or more, preferably 1.0 to 3.0 dl/g. If the 1,2-addition unit content is less than 70%, the thermoplasticity becomes insufficient and the rubber composition becomes inferior in processability. If the crystallinity of 1,2-PB is less than 5%, the thermoplasticity becomes insufficient, resulting in unsatisfactory processability of the rubber composition and the intended high-hardness rubber cannot be obtained. If the crystallinity of 1,2-PB exceeds 40%, the rubber composition will not form a uniform dispersion when mixed by means of an ordinary rubber processing machine.

The rubbers to be blended with 1,2-PB include natural rubber (NR) and diene-based rubber such as cis-polyisoprene rubber (IR), cis-polybutadiene rubber (BR), styrene-butadiene rubber (SBR) and acrylonitrile-butadiene rubber (NBR). These rubbers are used each alone or in mixture of two or more. The rubbers preferred in view of compatibility and mechanical properties are NR, IR, BR and SBR, and particularly preferred are NR and IR. The blending weight ratio of 1,2-PB to rubbers is (15-50)/(85-50). If the weight fraction of 1,2-PB is less than 15%, the thermoplasticity of uncured composition is insufficient and the improvement in both temperature dependency and hardness is unsatisfactory, whereas if it exceeds 50%, the rubber composition fails to exhibit an excellent rubbery elasticity.

The rubber composition of this invention is cured with sulfur contained therein. The compounding ratio of sulfur necessary to achieve the object of this invention is usually 3 parts by weight or more per 100 parts by weight of the rubber ingredients, depending upon the crystallinity and weight fraction of the 1,2-PB used. If the sulfur content is less than 3 parts by weight, the crosslinking density cannot be sufficiently increased, so that the physical properties of the vulcanizate are highly dependent upon temperature, and a high-hardness vulcanizate exhibiting excellent blow-out resistance cannot be obtained. In the case of a general rubber material, the blow-out resistance is deteriorated with an increase in crosslinking density, whereas the rubber composition of this invention is characterized in that with an increase in crosslinking density the blow-out resistance is markedly improved. If the sulfur content exceeds 10 parts by weight, it is difficult to obtain a high-hardness rubber with excellent rubbery elasticity.

The crosslinking (curing) with sulfur can be effected in any way by using regular curing equipments for general rubber materials, such as direct or indirect steam curing in autoclaves, atmospheric air curing, press curing, injection molding curing, and the like. In an example of press curing, sufficient curing was achieved at 150° C. in a curing time of 25 minutes.

The rubber composition of this invention is generally blended with carbon black in an amount of 20 to 70, preferably 40 to 60, parts by weight per 100 parts by weight of rubber ingredients including 1,2-PB. Since the rubber composition of this invention contains 1,2-PB capable of imparting a high hardness to the composition after curing, it is possible to obtain an intended hardness in a smaller amount of carbon black than usually used in customary rubber compositions. If the amount of carbon black exceeds 70 parts by weight, performance characteristics such as processability and rate of heat generation will be adversely affected, as in conventional high-hardness rubber compositions. If the amount of carbon black is less than 20 parts by weight, a sufficient reinforcing effect cannot be obtained, resulting in reduction in mechanical strength. This is disadvantageous in view of practical performance. The carbon black to be used is not restricted to any special type, and all of the regular types can be used.

The process oils suitable for use in the rubber composition of this invention are those of the naphthenic type and aromatic type. The amount to be used is 5 to 100, preferably 10 to 50, parts by weight per 100 parts by weight of the rubber ingredients including 1,2-PB. If the amount of process oils is less than 5 parts by weight, the dispersibility of fillers and vulcanization accelerators is adversely affected, whereas if it exceeds 100 parts by weight, the vulcanizate is inferior in strength, elasticity, and the like.

In addition to sulfur, carbon black and process oil, various other rubber compounding chemicals such as reinforcing agents, fillers, softeners and antioxidants can be incorporated in the rubber composition of this invention to produce respective effects on the composition.

The rubber compound thus obtained is characterized in that it is excellent in processability in the uncured state and capable of producing, upon curing, a rubber material having a high hardness and a high modulus which are low in temperature dependency, and having a low heat generation and excellent blow-out resistance. It is also a great feature of the composition that since the flow characteristics of the composition is excellent, the curing-adhesion to other rubbers or different materials, for example, fiber, bead wire, and the like is excellent.

Because of a number of its characteristic features not found in conventional high-hardness rubbers, the rubber composition of this invention is suitable for use in various structural members of a tire shown in FIG. 1, such as tread (1), TP wedge (2), TP filler (3), TP insert (4), SW filler (5), rim cushion (6), bead filler #1, #2 (7), bead insulation (8) and the like. In FIG. 1, (9) is side wall. The composition can, of course, be used also in the fields of other rubber products than tires, where advantage can be taken of the characteristic features of the rubber composition of this invention. Examples of such use fields include vibration isolators for automobiles, vibration isolators for the floor of buildings, and rail pads for railways.

The invention is illustrated below with reference to Examples, but the invention is not limited to such Examples. In the Examples, all parts and percentages are by weight unless otherwise indicated.

EXAMPLES 1 TO 6

A mixture of 1,2-PB having a 1,2-addition unit content of 92%, a crystallinity of 25% and an intrinsic viscosity of 1.3 dl/g (at 30° C. in toluene) [this 1,2-PB is hereinafter referred to as 1,2-PB (A)], natural rubber (RSS #3), sulfur, carbon black, and other compounding ingredients in the compounding ratios shown in Table 1 was mixed in a Banbury mixer and press cured at 150° C. for 30 minutes. Physical properties of the uncured composition and the cured composition were as shown in Table 5. The conditions for the measurement of physical properties were as summarized in Table 2.

EXAMPLES 7 TO 10

A mixture of 1,2-PB (A), cis-polyisoprene rubber having a cis-1,4-content of 98% and a Mooney viscosity [$ML_{1+4}$ (100° C.)] of 82 (JSR IR2200), cis-polybutadiene rubber having a cis-1,4 content of 97% and a Mooney viscosity [$ML_{1+4}$ (100° C.)] of 44 (JSR BR01), styrene-butadiene copolymer rubber having a bonded styrene content of 23.5% and a Mooney viscosity [$ML_{1+4}$ (100° C.)] of 52 (JSR 1500), sulfur, carbon black, and other rubber compounding ingredients in the compounding ratios shown in Table 3 was mixed and cured by the same method as in Example 1. Physical properties of the uncured rubber composition and the cured rubber composition were as shown in Table 5. The conditions for the measurement of physical properties were as summarized in Table 2.

EXAMPLES 11 TO 12

A mixture of 1,2-PB having a 1,2-addition unit content of 90%, a crystallinity of 17.8% and an intrinsic viscosity of 1.25 dl/g (at 30° C. in toluene) [this 1,2-PB is hereinafter referred to as 1,2-PB (B)] or another 1,2-PB having a 1,2-addition unit content of 93%, a crystallinity of 30% and an intrinsic viscosity of 1.25 dl/g (at 30° C. in toluene) [this 1,2-PB is hereinafter referred to as 1,2-PB (C)], and rubber compounding ingredients in the compounding ratios shown in Table 4 was mixed and cured by the same method as in Example 1. Physical properties of the uncured rubber composition and the cured rubber composition were as shown in Table 5. The conditions for the measurement of physical properties were as summarized in Table 2.

Table 1

| Recipe (Examples 1 to 5) | | | | | | |
|---|---|---|---|---|---|---|
| Ingredient \ Example No. | 1 | 2 | 3 | 4 | 5 | 6 |
| 1,2-PB (A) | 50 | 25 | 25 | 25 | 25 | 15 |
| RSS #3 | 50 | 75 | 75 | 75 | 75 | 85 |
| Zinc oxide #3 | 3 | | | | | |
| Stearic acid | 1 | | | | | |
| HAF carbon black | 40 | | | | | |
| Naphthenic oil | 5 | | The same as given in the left column. | | | |
| Antioxidant 810-NA[1] | 1 | | | | | |
| Vulcanization accelerator DM[2] | 2 | | | | | |
| Vulcanization accelerator TT[3] | 0.1 | | | | | |
| Sulfur | 7.5 | 7.5 | 3 | 4 | 6 | 6 |

[1]N-Isopropyl-N'-phenyl-p-phenylenediamine.
[2]Dibenzothiazole disulfide.
[3]Tetramethylthiuram disulfide.

Table 2

| | Summary of conditions for measuring physical properties. |
|---|---|
| Item of test | Conditions for test |
| Mooney viscosity | JIS K6300, $ML_{1+4}$ at 100° C. |
| Green strength | Autograph IS-2000 of Shimadzu Seisakusho Ltd. was used. Type of test specimen: JIS K6301 No. 3 dumbbell test specimen. Temperature of test: repetitions C. The value of yield stress estimated from stress-strain curve was taken as green strength. |
| Flow characteristics | Koka type flow tester was used. Load: 50 kg. Temperature of test: 120° C. Nozzle : 1 φ × 1 L. |
| 100% Modulus and elongation | JIS K6301. Temperature range of test: 25°–130° C. Test specimen: ring type, 1 mm in thickness and 40 mm in circumference. Time of preheating: 10 minutes. |
| Impact resilience | JIS impact resilience tester was used. |
| Permanent set | JIS K6301, however measured at 100% constant elongation. |
| Heat generation test | Goodrich flexometer was used. Load: 24 lbs. stroke: 0.175 in. Frequency: 1800 cpm. Temperature of test: 38 ± 1° C. Preheating: 30 minutes. Running time: 30 minutes. |
| Blow-out test | Goodrich flexometer was used. Load 48 lbs. Stroke: 0.25 in. Frequency: 1800 cpm. Temperature of test: room temperature. |
| Pull-out test | Autograph IS-2000 of Shimadzu Seisakusho Ltd. was used. Pull-out speed: 50 mm/minute. |
| Pull-out fatigue test | Autograph IS-2000 of Shimadzu Seisakusho Ltd. was used. Pull-out speed: 50 mm/minute. Test specimen was subjected to repeated stretch fatigue at constant stress and the number of repetitions required before the bead wire was pulled out was measured. |

Table 3

Recipe (Examples 7 to 10)

| Ingredient | 7 | 8 | 9 | 10 |
|---|---|---|---|---|
| 1,2-PB (A) | 50 | 25 | 25 | 25 |
| JSR IR2200 | 50 | 75 | — | — |
| JSR 1500 | — | — | 75 | — |
| JSR BR01 | — | — | — | 75 |
| Zinc oxide #3 | 3 | | | |
| Stearic acid | 1 | | | |
| HAF carbon black | 40 | | | |
| Naphthenic oil | 5 | The same as given in the left column. | | |
| Antioxidant 810-NA[1] | 1 | | | |
| Vulcanization accelerator DM[2] | 2 | | | |
| Vulcanization accelerator TT[3] | 0.1 | | | |
| Sulfur | 6 | 6 | 6 | 6 |

Note:
[1] N-Isopropyl-N'-phenyl-p-phenylenediamine
[2] Dibenzothiazole disulfide
[3] Tetramethylthiuram disulfide

Table 4

Recipe (Examples 11 and 12)

| Ingredient | 11 | 12 |
|---|---|---|
| 1,2-PB (B) | 25 | — |
| 1,2-PB (C) | — | 25 |
| RSS #3 | 75 | 75 |
| Zinc oxide #3 | 3 | 3 |
| Steric acid | 1 | 1 |
| HAF carbon black | 40 | 40 |
| Naphthenic oil | 5 | 5 |
| Antioxidant 810-NA[(1)] | 1 | 1 |
| Vulcanization accelerator DM[(2)] | 2 | 2 |
| Vulcanization accelerator TT[(3)] | 0.1 | 0.1 |
| Sulfur | 6 | 6 |

Note:
[(1)], [(2)] and [(3)] are the same as in Table 3.

Table 5

Summary of physical properties (Examples 1 to 12)

| | | Example No. | 1 | 2 | 3 | 4 | 5 | 6 | 7 |
|---|---|---|---|---|---|---|---|---|---|
| | | Blending ratio of rubbers | 1,2-PB (A):NR = 50:50 | 1,2-PB (A):NR = 25:75 | 1,2-PB (A):NR = 25:75 | 1,2-PB (A):NR = 25:75 | 1,2-BP (A):NR = 25:75 | 1,2-PB (A):NR = 15:85 | 1,2-PB (A):NR = 50:50 |
| | | Sulfur | 7.5 | 7.5 | 3 | 4 | 6 | 6 | 6 |
| Physical property | Uncured rubber composition | Mooney viscosity, $ML_{1+4}$ (100° C.) | 56 | 58 | 56 | 57 | 58 | 65 | 50 |
| | | Green strength, $\sigma y$ (kg/cm²) | 56 | 44 | 47 | 46 | 45 | 40 | 50 |
| | | Flow characteristics, $Q \times 10^{-3}$ (cc/sec) | 20 | 4.8 | 4.8 | 4.7 | 4.9 | 2.0 | 25 |
| | | Residual crystallinity, X (%) | 3.8 | 1.0 | 2.1 | 1.8 | 1.5 | 1.0 | 3.7 |
| | | Coefficient of volume change, ΔV (%) | 128 | 128 | 175 | 145 | 138 | 135 | 135 |
| Cured rubber | 100% modulus $M_{100}$ (kg/cm²) | 25° C. | 76 | 52 | 42 | 47 | 50 | 46 | 70 |
| | | 50° C. | 57 | 46 | 37 | 42 | 46 | 43 | 51 |
| | | 80° C. | 46 | 41 | 33 | 38 | 41 | 40 | 42 |
| | | 100° C. | 47 | 41 | 31 | 37 | 39 | 39 | 40 |
| | | 130° C. | 46 | 40 | 30 | 36 | 38 | 38 | 38 |
| | Hardness $H_S$ (JIS A) | 25° C. | 83 | 77 | 75 | 76 | 77 | 74 | 83 |
| | | 50° C. | 79 | 74 | 72 | 73 | 74 | 72 | 78 |
| | | 80° C. | 74 | 72 | 70 | 71 | 72 | 70 | 74 |
| | | 100° C. | 74 | 72 | 69 | 71 | 71 | 70 | 74 |
| | | 130° C. | 74 | 71 | 68 | 70 | 71 | 70 | 73 |
| | Impact resilience, R (%) | | 49 | 58 | 55 | 56 | 57 | 62 | 48 |
| | Permanent set, PS (%) | | 8 | 4 | 7 | 6 | 5 | 3 | 8 |
| | Heat generation test, ΔT (°C.) | | 12 | 10 | 12 | 11 | 11 | 10 | 12 |
| | Blow out test, time (min) | | >120 | >120 | 85 | >120 | >120 | >120 | >120 |

Table 5-continued

Summary of physical properties (Examples 1 to 12)

| Example No. | 8 | 9 | 10 | 11 | 12 |
|---|---|---|---|---|---|
| Blending ratio | 1,2-PB (A):IR = 25:75 | 1,2-PB (A):BR:SBR = 25:75 | 1,2-PB (A):NR = 25:75 | 1,2-PB (B):NR = 25:75 | 1,2-PB (C) = 25:75 |
| Sulfur | 6 | 6 | 6 | 6 | 6 |
| Mooney viscosity | 53 | 49 | 52 | 48 | 65 |
| Green strength | 27 | 17 | 17 | 38 | 61 |
| Flow characteristics | 8.1 | 4.7 | 4.7 | 7.5 | 6.9 |
| Residual crystallinity | 1.3 | 1.2 | 1.2 | 0.8 | 2.3 |
| Coeff. volume change | 127 | 130 | 130 | 132 | 134 |
| 25° C. | 50 | 47 | 47 | 35 | 64 |
| 50° C. | 45 | 42 | 42 | 30 | 58 |
| 80° C. | 40 | 38 | 38 | 26 | 52 |
| 100° C. | 40 | 37 | 37 | 26 | 50 |
| 130° C. | 38 | 35 | 35 | 25 | 48 |
| 25° C. | 76 | 77 | 77 | 73 | 82 |
| 50° C. | 73 | 73 | 72 | 69 | 76 |
| 80° C. | 71 | 72 | 72 | 69 | 76 |
| 100° C. | 71 | 72 | 72 | 69 | 75 |
| 130° C. | 70 | 70 | 70 | 68 | 74 |
| Impact resilience | 57 | 59 | 52 | 60 | 52 |
| Permanent set | 5 | 5 | 7 | 4 | 7 |
| Heat generation | 11 | 15 | 20 | 10 | 13 |
| Blow out test | >120 | >120 | >120 | >120 | >120 |

COMPARATIVE EXAMPLES 1 AND 2

A cured rubber was obtained by the same method as in Example 2, except that 1.5 or 2 parts by weight of sulfur was used. Physical properties of the uncured rubber composition and the cured rubber were as shown in Table 6.

COMPARATIVE EXAMPLE 3

A cured rubber was obtained by the same method as in Example 2, except that 12 parts by weight of sulfur was used. Physical properties of the uncured rubber composition and the cured rubber were as shown in Table 6.

COMPARATIVE EXAMPLE 4

A cured rubber was obtained by the same method as in Example 5, except that 100 parts by weight of 1,2-PB (A) was used. Physical properties of the uncured rubber composition and the cured rubber were as shown in Table 6.

COMPARATIVE EXAMPLE 5

A cured rubber was obtained by the same method as in Example 5, except that 100 parts by weight of natural rubber (RSS #3) was used. Physical properties of the uncured rubber composition and the cured rubber were as shown in Table 6.

COMPARATIVE EXAMPLE 6

This example presents a high-hardness rubber prepared by incorporating a large amount of carbon black. A cured rubber was obtained by the same method as in Example 5, except that 1,2-PB was not used and 100 parts by weight of natural rubber (RSS #3), 2.5 parts by weight of sulfur, 80 parts by weight of carbon black and 15 parts by weight of an aromatic oil were used. Physical properties of the uncured rubber composition and the cured rubber were as shown in Table 6.

Table 6

Summary of physical properties (Comparative Examples 1 to 6)

| | Comparative Example No. | | 1 | 2 | 3 | 4 | 5 | 6 |
|---|---|---|---|---|---|---|---|---|
| | Blending ratio of rubbers | | 1,2-PB (A):NR = 25:75 | 1,2-PB (A):NB = 25:75 | 1,2-PB (A):NR = 25:75 | 1,2-PB (A) = 100 | NR = 100 | NR = 100 |
| Physical property | Sulfur | | 1.5 | 2 | 12 | 6 | 6 | 6 |
| Uncured rubber composition | Mooney viscosity, $ML_{1+4}$ (100° C.) | | 60 | 59 | 58 | 87 | 65 | 112 |
| | Green strength, $\sigma y$ (kg/cm²) | | 47 | 47 | 42 | 105 | 28 | 32 |
| | Flow characteristics, $Q \times 10^{-3}$ 3 (cc/sec) | | 5.0 | 4.9 | 4.8 | 90 | 1.0 | 0.1 |
| | Residual crystallinity, X (%) | | 4.5 | 4.4 | 0.5 | 8.5 | 0 | 0 |
| | Coefficient of volume change, V (%) | | 270 | 240 | 90 | 145 | 130 | 130 |
| Cured rubber | 100% Modulus $M_{100}$ (kg/cm²) | 25° C. | 34 | 38 | 88 | 142 | 30 | 52 |
| | | 50° C. | 18 | 24 | 72 | 112 | 26 | 48 |
| | | 80° C. | 16 | 20 | — | — | 25 | 43 |
| | | 100° C. | 15 | 19 | — | — | 25 | 40 |
| | | 130° C. | 15 | 19 | — | — | 25 | 40 |
| | Hardness $H_S$ (JIS A) | 25° C. | 78 | 78 | 81 | 91 | 66 | 81 |
| | | 50° C. | 70 | 71 | 80 | 83 | 64 | 77 |
| | | 80° C. | 65 | 66 | 79 | 82 | 63 | 76 |
| | | 100° C. | 62 | 64 | 78 | 81 | 63 | 76 |
| | | 130° C. | 60 | 61 | 78 | 81 | 62 | 75 |
| | Impact resilience, R (%) | | 55 | 55 | 58 | 8 | 59 | 30 |
| | Permanent set, PS (%) | | 10 | 9 | 4 | 15 | 3 | 6 |
| | Heat generation test, $\Delta T$ (°C.) | | 14 | 14 | 10 | 11 | 11 | 40 |
| | Blow out test, time (min.) | | 22 | 30 | >120 | >120 | 29 | 10 |

EXAMPLE 13

On the assumption that the rubber composition of this invention might be used in a tire rim cushion of a high-hardness rubber, an experiment was conducted, taking into account the practical conditions of use.

The uncured rubber compositions prepared in Examples 4 and 7 (Run No. 1 and Run No. 2, respectively) and a rubber composition of the tire side-wall recipe shown in Table 7 were molded by means of an extruder into rods and bonded together, as shown in FIG. 2, by curing under the same conditions as described in Example 4. In FIG. 2, (10) is the side-wall rubber and (11) is the rubber composition of Example 4. The bonded rod was tested for blow-out time by using Goodrich flexometer. The results obtained were as shown in Table 8.

Table 7

| Recipe (tire side-wall) | |
|---|---|
| RSS #3 | 50 |
| JSR BR01 | 50 |
| Zinc oxide #3 | 5 |
| Stearic acid | 1 |
| HAF carbon black | 45 |
| Aromatic oil | 3 |
| Antioxidant 810-NA[1] | 1 |
| Vulcanization accelerator CZ[2] | 1.5 |
| Sulfur | 1.8 |

Note:
[1] N-isopropyl-N'-phenyl-p-phenylenediamine
[2] N-cyclohexyl-2-benzothiazyl sulfenamide

COMPARATIVE EXAMPLE 7

Using the uncured rubber composition of Comparative Example 5, a test specimen of bonded rod was prepared by vulcanization-bonding in the same manner as in Example 12. The specimen was tested by means of Goodrich flexometer for blow-out time to evaluate the anti-fatigue characteristics. The results obtained were as shown in Table 8.

Table 8

| Test results of Example 13 and Comparative Example 7 | | | | |
|---|---|---|---|---|
| Example No. | | Example 13 | | Comparative Example 7 |
| | Run No. | 1 | 2 | — |
| Test item | Rubber | 1,2-PB (A)/ RSS #3 | 1,2-PB (A)/ JSR IR2200 | RSS #3 |
| Blow-out time (minute) | Sample No. 1 | 85 | 75 | 13 |
| | Sample No. 2 | 80 | 92 | 21 |
| | Sample No. 3 | 78 | 88 | 14 |
| | Sample No. 4 | 105 | 76 | 14 |
| | Sample No. 5 | 90 | 85 | 15 |

EXAMPLE 14

On the assumption that the rubber composition of this invention might be used in a bead insulation member of high-hardness rubber, an experiment was conducted taking into account the practical conditions of use.

An uncured rubber composition for test was prepared in the same manner as in Example 5, except that 50 parts by weight of carbon black was used. The rubber composition and the bead wire were cure-molded into a test specimen, 50 mm in width (α) and 10 mm in thickness (β), as shown in FIG. 3, in which (12) is the cured rubber and (13) is the bead wire. The curing conditions were the same as in Example 6. The results of bead wire pull-out test and pull-out fatigue test were as shown in Table 10.

COMPARATIVE EXAMPLE 8

Using a conventional bead insulation rubber composition of the formula shown in Table 9, a test specimen was prepared by cure-molding in the same manner as in Example 14. The results of pull-out test and pull-out fatigue test were as shown in Table 10.

Table 9

| Test formula | |
|---|---|
| JSR 1500 | 60 |
| RSS #3 | 40 |
| Activated zinc oxide | 3 |
| Stearic acid | 1 |
| FEF carbon black | 40 |
| Silica | 30 |
| Activated calcium carbonate | 50 |
| Coumarone resin | 5 |
| Naphthenic oil | 15 |
| Antioxidant, 810-NA[1] | 1 |
| Diethylene glycol | 3 |
| Vulcanization accelerator, CZ[2] | 1.5 |
| Vulcanization accelerator, D[3] | 0.5 |
| Sulfur | 5.0 |

Note:
[1] and [2] are the same as in Table 7.
[3] Diphenylguanidine.

Table 10

| | Test results of Example 14 and Comparative Example 8. | |
|---|---|---|
| | Example 14 | Comparative Example 8 |
| Pull-out strength (kg/wire)[1] | 92 | 80 |
| Pull-out fatigue test (number of repetitions)[2] | 120 | 38 |

Note:
[1] The maximum stress applied to pull the bead wire out of the rubber.
[2] The number of repetitions of the intermittent application of pull stress of 70 kg to the bead wire before the wire was pulled out of the rubber.

From the aforementioned results of various tests, it is seen that the rubber composition of this invention has a desirable processability and exhibits, on curing, a high hardness and high modulus, both being low in temperature dependency, a low heat generation, an excellent antifatigue characteristics (blow-out resistance) and a good adhesiveness.

What is claimed is:

1. A high-hardness and high-modulus rubber composition, comprising: 15 to 50 parts by weight of 1,2-polybutadiene having a 1,2-addition unit content of at least 70%, a crystallinity of 5 to 40% and an intrinsic viscosity [η] of at least 0.7 dl/g as measured in toluene at 30° C., 85 to 50 parts by weight of at least one rubber selected from the group consisting of natural rubber and diene-based rubbers, and 3 to 10 parts by weight of sulfur per 100 parts by weight of the rubber ingredients.

2. The rubber composition according to claim 1, wherein the 1,2-polybutadiene has a 1,2-addition unit content of at least 80% and a crystallinity of 10 to 30%.

3. The rubber composition according to claim 1, wherein the 1,2-polybutadiene has an intrinsic viscosity [η] of 1.0 to 3.0 dl/g as measured in toluene at 30° C.

4. The rubber composition according to claim 1, wherein the rubber is natural rubber, polyisoprene, styrene-butadiene copolymer, or polybutadiene.

5. The rubber composition according to claim 1, wherein the rubber is natural rubber or polyisoprene.

6. The rubber composition according to claim 1, which has a residual crystallinity of up to 4%.

7. The rubber composition according to claim 1, which has a residual crystallinity of up to 3%.

8. The rubber composition according to claim 1, which has a coefficient of volume change of at least 100% (in toluene).

9. The rubber composition according to claim 1, which has a coefficient of volume change of 120 to 200% (in toluene).

10. The rubber composition according to claim 1, in which the sulfur is contained in an amount of 4 to 8 parts by weight per 100 parts by weight of the rubber ingredienets.

11. The rubber composition according to claim 1, which further contains 20 to 70 parts by weight of carbon black per 100 parts by weight of the rubber ingredients.

12. The rubber composition according to claim 1, which further contains 40 to 60 parts by weight of carbon black per 100 parts by weight of the rubber ingredients.

13. The rubber composition according to claim 1, which further contains 5 to 100 parts by weight of a process oil per 100 parts by weight of the rubber ingredients.

14. The rubber composition according to claim 1, which further contains 10 to 50 parts by weight of a process oil per 100 parts by weight of the rubber ingredients.

* * * * *